United States Patent
Blackburne, Jr.

(10) Patent No.: US 10,895,134 B2
(45) Date of Patent: Jan. 19, 2021

(54) PERFORATED PIPE SYSTEM AND METHOD OF USE

(71) Applicant: Edward F. Blackburne, Jr., New York, NY (US)

(72) Inventor: Edward F. Blackburne, Jr., New York, NY (US)

(*) Notice: Subject to any disclaimer, the term of this patent is extended or adjusted under 35 U.S.C. 154(b) by 0 days.

(21) Appl. No.: 16/122,465

(22) Filed: Sep. 5, 2018

(65) Prior Publication Data

US 2019/0071954 A1 Mar. 7, 2019

Related U.S. Application Data

(60) Provisional application No. 62/554,168, filed on Sep. 5, 2017.

(51) Int. Cl.
| | |
|---|---|
| *E21B 43/08* | (2006.01) |
| *B01D 29/21* | (2006.01) |
| *B01D 39/20* | (2006.01) |
| *B01D 29/11* | (2006.01) |
| *B01D 29/33* | (2006.01) |
| *G06F 16/22* | (2019.01) |
| *G06F 16/28* | (2019.01) |
| *G06F 16/26* | (2019.01) |
| *G06F 7/08* | (2006.01) |

(52) U.S. Cl.
CPC .......... *E21B 43/082* (2013.01); *B01D 29/111* (2013.01); *B01D 29/216* (2013.01); *B01D 29/33* (2013.01); *B01D 39/20* (2013.01); *E21B 43/086* (2013.01); *G06F 7/08* (2013.01); *G06F 16/2237* (2019.01); *G06F 16/26* (2019.01); *G06F 16/285* (2019.01)

(58) Field of Classification Search
CPC ...... E21B 43/082; B01D 29/216; B01D 29/33
See application file for complete search history.

(56) References Cited

U.S. PATENT DOCUMENTS

| | | | | |
|---|---|---|---|---|
| 2008/0023393 | A1* | 1/2008 | Blackburne, Jr. | B01D 29/111 210/455 |
| 2014/0326447 | A1* | 11/2014 | Fermaniuk | E21B 43/086 166/227 |

* cited by examiner

*Primary Examiner* — Giovanna Wright
*Assistant Examiner* — Dany E Akakpo
(74) *Attorney, Agent, or Firm* — Richard Eldredge; Eldredge Law Firm

(57) ABSTRACT

An elongated shroud includes a perforated exterior surface, having rows of holes extending into an interior of the elongated shroud; each row of the have holes of a same width; and the width of the holes associated with each row decrease in each row out from a center row of holes.

11 Claims, 4 Drawing Sheets

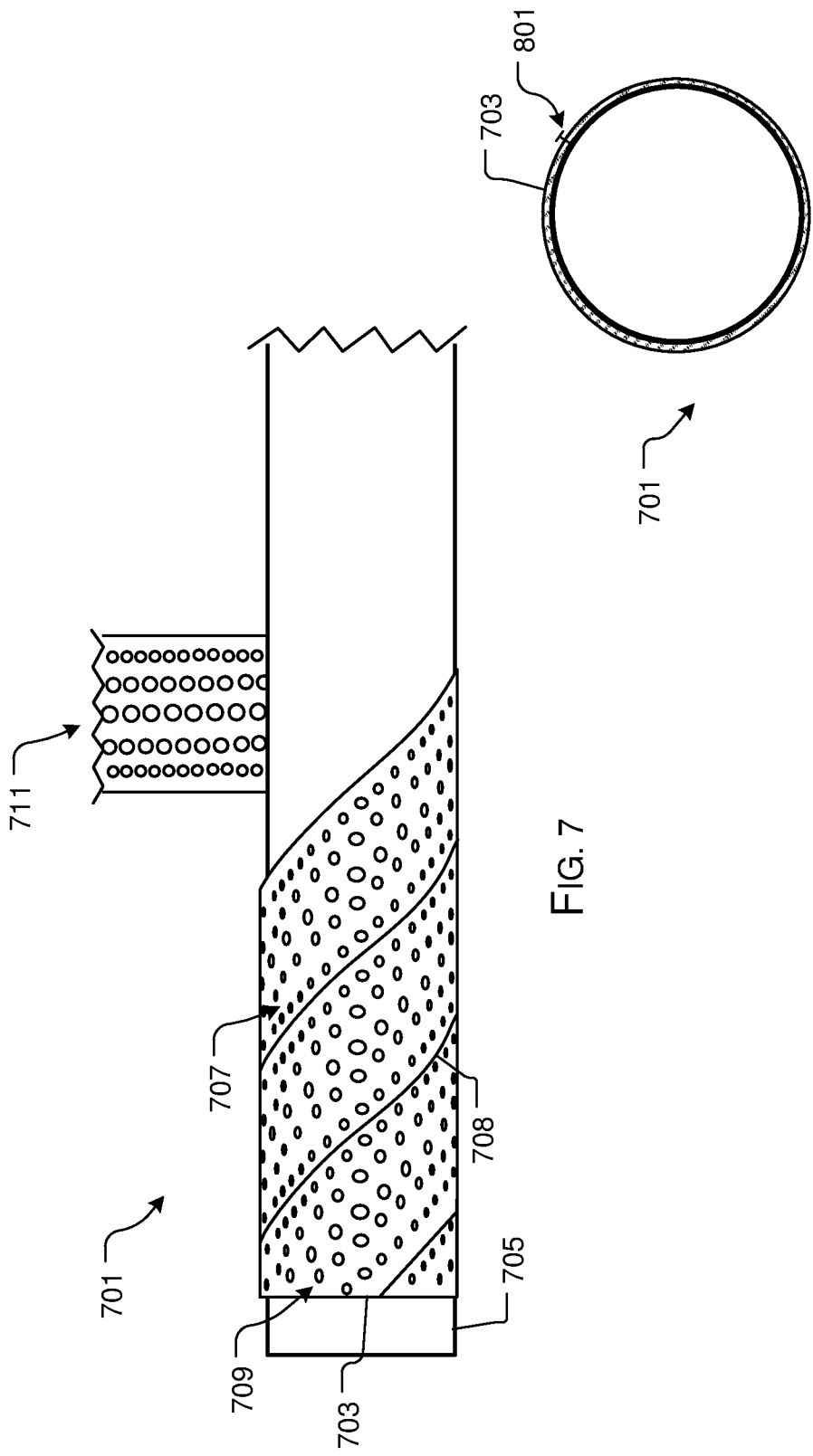

PERFORATED PIPE SYSTEM AND METHOD OF USE

BACKGROUND

1. Field of the Invention

The present invention relates generally to pipes, and more specifically, to a perforated shroud and screen system for improved longevity of the shroud and corresponding components, specifically during filtration of fluids.

2. Description of Related Art

Screen systems are well known in the art and are effective means to filter fluids, specifically during well drilling. For example, FIG. 1 depicts a conventional screen system 101 having a shroud 103 with a perforated exterior surface 105, wherein shroud 103 is used for well drilling. As shown in FIG. 2, perforated exterior surface 105 has a plurality of same sized holes 201. In addition, as shown in FIG. 3, shroud 103 is substantially thick. During use, fluid flows through holes 201 for filtration.

One of the problems commonly associated with system 101 is erosion. Specifically, during use, the majority of fluid will flow through holes near seams 109, thereby causing erosion of the holes near the seams. This causes uneven erosion, resulting in the need for a thick wall of the pipe, or alternatively, for replacement of the screen assembly frequently.

Accordingly, although great strides have been made in the area of filter systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 7 is a side view of a screen system in accordance with an alternative embodiment of the present application;

FIG. 8 is an end view of the screen system of FIG. 7; and

Figure 1:
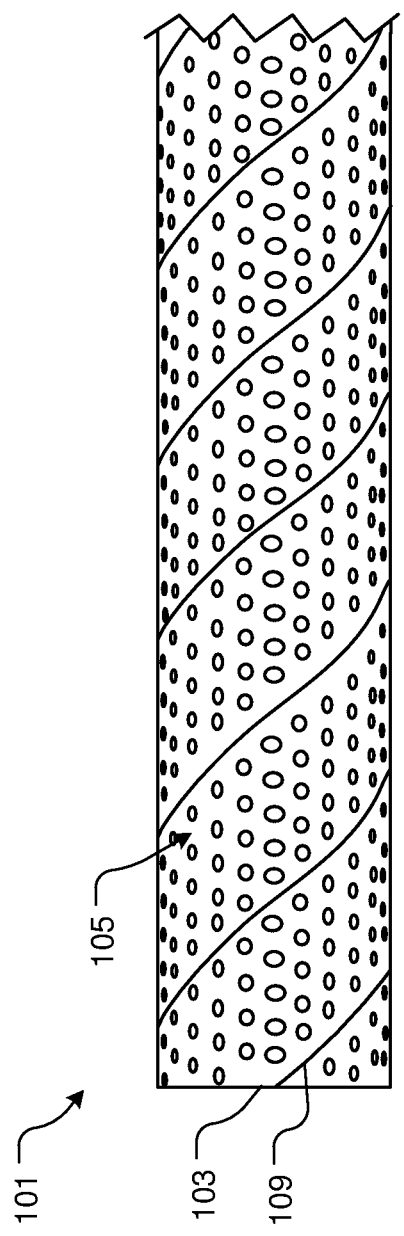
FIG. 1 is a side view of a common screen system.
Figure 3:
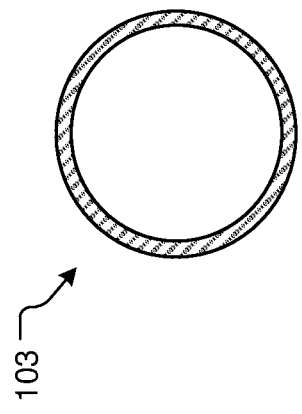
FIG. 3 is an end view of the shroud of FIG. 1.
Figure 2:
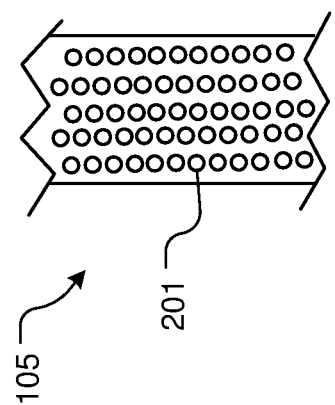
FIG. 2 is a flattened view of a segment of the shroud pipe of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional screen systems. Specifically, the present invention provides a means to evenly distribute fluid flow through a perforated shroud, wherein erosion is reduced and uniform. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 4:
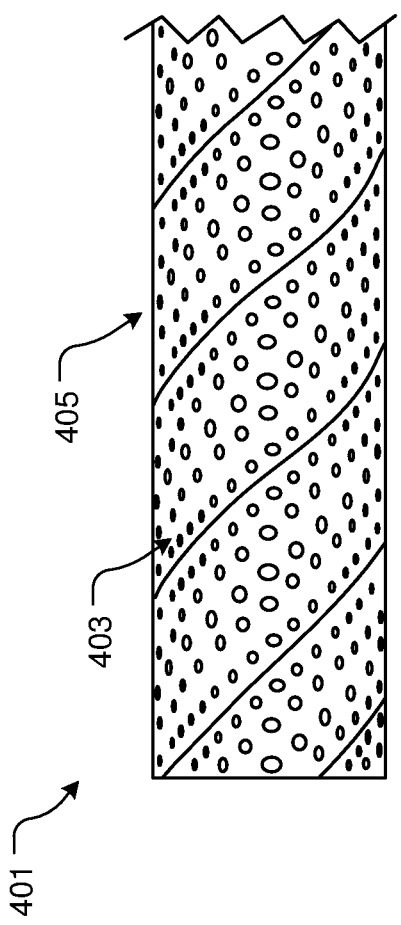
FIG. 4 is a side view of a shroud in accordance with an embodiment of the present application.

Referring now to the drawings wherein like reference characters identify corresponding or similar elements throughout the several views, FIG. 4 depicts a side view of a pipe 401 in accordance with a preferred embodiment of the present application. It will be appreciated that shroud 401 overcomes one or more of the above-listed problems commonly associated with conventional screen systems.

In the contemplated embodiment, shroud 401 includes an exterior surface 403 having a plurality of rows 405 of holes, wherein the holes extend into an interior 601 of shroud 401. It should be appreciated that although holes are shown substantially round, it is contemplated that they can be round, rectangular, hexagonal, octagonal, slatted, or any other shape. It should further be appreciated that the number and density of holes can vary. It should also be appreciated that the pattern of the holes can be altered to control the flow through the shroud 401 to a pipe, specifically the location of flow and the rate.

Figure 6:
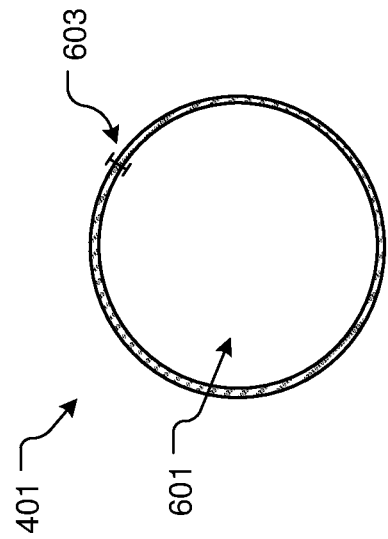
FIG. 6 is an end view of the shroud of FIG. 4.
Figure 5:
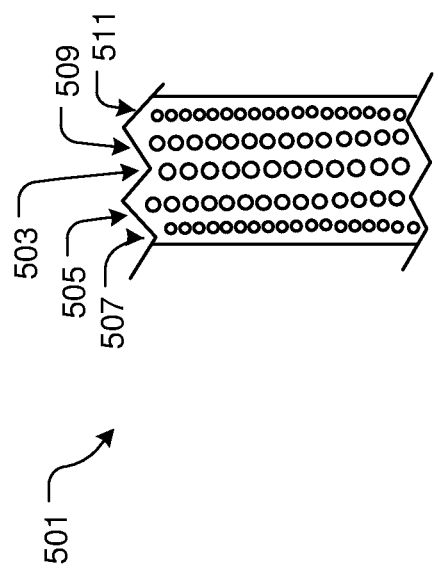
FIG. 5 is a flattened view of a segment of the shroud of FIG. 4.

In FIG. 5, a cutout 501 of shroud 401 is shown. In the preferred embodiment, a center row 503 has a plurality of holes of a specified width. The adjoining rows 505, 507, 509, 511 have holes with widths decreases as rows get further away from the center row 503. It should be appreciated that this configuration forces some fluid to pass over the smaller holes during use, thereby creating more even erosion of shroud 401. As shown in FIG. 6, due to the even erosion rate, the overall thickness 603 of shroud 401 can be reduced as compared to conventional screen assemblies used for well drilling.

FIGS. 4-6 depict a pipe, wherein the perforation is directly incorporated into the pipe. It should be appreciated that although pipe 401 is conventionally used in well drilling, the features and principles of pipe 401 can further be incorporated into other industries wherein fluid/air flow is typical. In addition, although pipe 401 depicts the plurality of rows traveling helically about pipe 401, it is contemplated that various other configurations could be used to achieve the desired effect.

In FIGS. 7 and 8, an alternative embodiment of the present invention depicts a screen system 701, wherein a shroud 703 or protective layer of material, is attached to a pipe 705. It should be appreciated that shroud 703 can vary in size and material as functional considerations require. In addition, shroud 703 can be permanently or removably attached to pipe 701. Shroud 703 includes a perforated surface 707, wherein a plurality of rows 709 of holes are disposed therethrough. The holes and rows are arranged in the same fashion as is described above with pipe 401. Specifically, shroud 703 includes a center row 711 having holes of a specified width, wherein adjoining rows have holes of decreasing widths. This confirmation places the smallest holes near seams 708 created by the shroud. In one embodiment, shroud 703 is helically wrapped/attached to pipe 705, however it should be appreciated that shroud 703 can be formed independently of pipe 705, then slid onto pipe 705 and attached. As shown in FIG. 8, shroud 703 has a thickness 801 substantially thinner than the thickness of conventional shrouds/protective covers.

It should be appreciated that one of the unique features believed characteristic of the present application is the configuration of rows of holes about a shroud. It should be appreciated that this configuration forces fluid to enter all holes of the perforation in a substantially uniform manner, instead of the majority of fluid entering exterior holes. Specifically, during spinning of the screen assembly system, fluid is forced to first come into contact with the holes near the seams of the shroud or the pipe. When the holes near the seams are the smallest, the fluid is then forced toward the center, thereby creating a substantially uniform erosion effect on the entire pipe or shroud. In addition, this configuration allows for the pipe or shroud to be significantly thinner than conventional well pipes or shrouds, due to the reduced need to counteract erosion.

Figure 9:
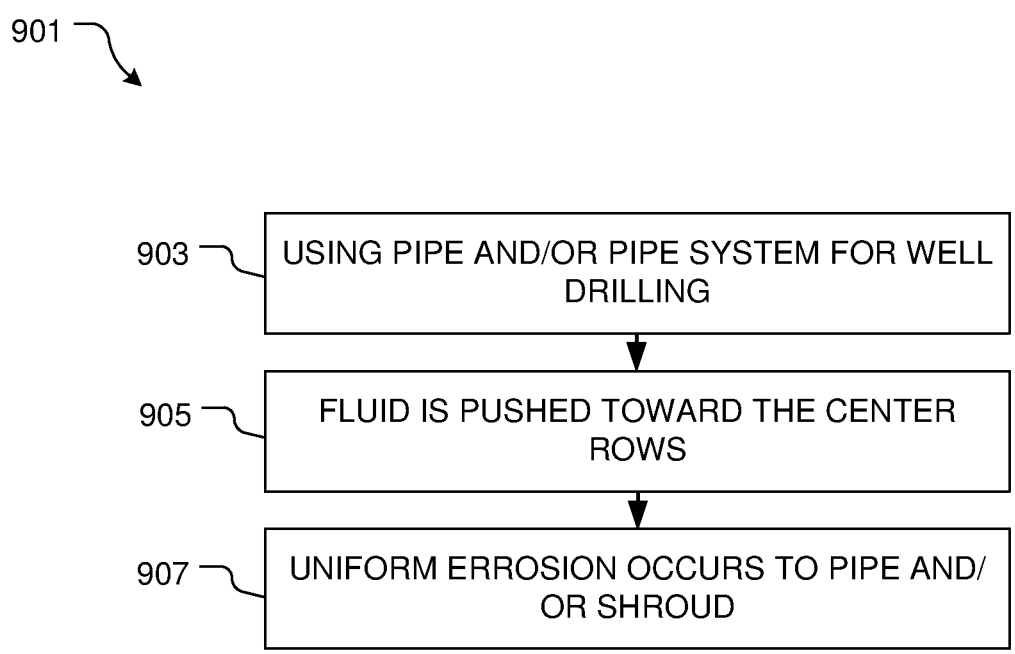
FIG. 9 is a flowchart of the method of the shroud of FIG. 4 and the screen system of FIG. 7.

In FIG. 9, a flowchart 901 depicts the method of use of shroud 401 or screen system 701. During use, the shroud or screen system is used in a well, wherein the perforated surface allows for filtering fluids, as shown with box 903. During filtering, fluid is pushed toward the center rows based on resistance created by the smaller holes, as shown with box 905. The pipe and/or shroud, as well as other components such as a filter, are eroded at a substantially uniform rate, as shown with box 907.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A elongated shroud, comprising:
a perforated exterior surface, having:
a plurality of rows of holes extending into an interior of the elongated shroud, the plurality of rows comprising:
a center row of center holes, each of the center holes having a first width, the first width being the same for each center holes;
a first row of first holes extending parallel to the center row of holes, the first holes having a second width, the first width is greater than the second width; and
a second row of second holes extending parallel to the first row of first holes, the second holes having a third width, the second width is greater than the third width.

2. The elongated shroud of claim 1, wherein the plurality of rows of holes are positioned in a helical pattern on the perforated exterior surface.

3. The elongated shroud of claim 1, wherein the plurality of rows of holes have circular holes.

4. The elongated shroud of claim 1, wherein the plurality of rows of holes have rectangular holes.

5. The elongated shroud of claim 1, wherein the plurality of rows of holes have octagon holes.

6. A screen system, comprising:
an elongated pipe; and
a shroud configured to attach to the elongated pipe, the shroud having:
a perforated exterior surface, having:
a plurality of rows of holes extending through the shroud, the plurality of rows comprising:
a center row of center holes, each of the center holes having a first width, the first width being the same for each center holes;
a first row of first holes extending parallel to the center row of holes, the first holes having a second width, the first width is greater than the second width; and
a second row of second holes extending parallel to the first row of first holes, the second holes having a third width, the second width is greater than the third width.

7. The screen system of claim 6, wherein the plurality of rows of holes have circular holes.

8. The screen system of claim 6, wherein the plurality of rows of holes have rectangular holes.

9. The screen system of claim 6, wherein the plurality of rows of holes have octagon holes.

10. The screen system of claim 6, wherein the shroud is configured to helically wrap shroud around the elongated screen system of claim 1, wherein the shroud is configured to helically wrap around the elongated shroud thereby positioning the plurality of rows in a helical pattern around the shroud.

11. The screen system of claim 6, wherein the shroud is configured to straight seam shroud around the elongated Pipe, thereby positioning the plurality of rows in a straight pattern around the shroud.

* * * * *